United States Patent [19]

Uchida et al.

[11] Patent Number: 4,759,590

[45] Date of Patent: Jul. 26, 1988

[54] ANTI-SKID BRAKING SYSTEM OF FOUR-WHEEL DRIVE VEHICLE AND METHOD FOR CONTROLLING THE SAME

[75] Inventors: Kiyoyuki Uchida, Susono; Tatsuo Sugitani, Mishima, both of Japan

[73] Assignee: Toyota Jidosha Kabushiki Kaisha, Japan

[21] Appl. No.: 925,781

[22] Filed: Oct. 31, 1986

[30] Foreign Application Priority Data

Nov. 5, 1985 [JP] Japan .................................. 60-247642

[51] Int. Cl.$^4$ .................................. B60T 8/70; B60T 8/58
[52] U.S. Cl. .................................. 303/106; 303/100; 364/426
[58] Field of Search .................. 180/197; 303/93, 96, 303/91, 20, 100, 102, 103, 104, 106, 110, 111; 364/426

[56] References Cited

U.S. PATENT DOCUMENTS

| 4,349,876 | 9/1982 | Lindemann | 303/111 |
| 4,374,421 | 2/1983 | Leiber | 303/111 |
| 4,509,802 | 4/1985 | Solleder et al. | 180/197 |
| 4,568,130 | 2/1986 | Leiber | 303/110 X |
| 4,583,611 | 4/1986 | Frank et al. | 303/106 |
| 4,589,511 | 5/1986 | Leiber | 180/197 |

FOREIGN PATENT DOCUMENTS 0014954 2/1980 European Pat. Off. .
26660 2/1980 Japan .

Primary Examiner—Andres Kashnikow
Assistant Examiner—Timothy Newholm
Attorney, Agent, or Firm—Parkhurst & Oliff

[57] ABSTRACT

An anti-skid braking system for a four-wheel drive vehicle in which all of the four wheels are driven by a single drive source and are connected to each other by front and rear pairs of axles connected by a propeller shaft, and a differential disposed on at least one of the front and rear pairs of axles. The braking system includes an actuator for controlling mutually independently the braking pressures of at least one pair of left and right wheels connected to the axles between which the differential is disposed, and further includes a controller for controlling the actuator so as to maintain the slip ratios of the left and right wheels within an optimum range, thereby preventing skidding of the wheels on a road surface upon brake application. The controller determines for each of the left and right wheels, whether the braking pressure must be increased or decreased, and commands the actuator, upon determination of simultaneous increases and/or simultaneous decreases of the braking pressures of both of the left and right wheels, such that the braking pressure of one of the left and right wheels is controlled in a normal manner as determined by the controller, while the braking pressure in the other of the left and right wheels is controlled in an override manner different from the normal manner.

11 Claims, 5 Drawing Sheets

ANTI-SKID BRAKING SYSTEM OF FOUR-WHEEL DRIVE VEHICLE AND METHOD FOR CONTROLLING THE SAME

BACKGROUND OF THE INVENTION

1. Field of the Invention

The present invention relates generally to an anti-skid braking system for an automotive vehicle, capable of preventing an excessive slip ratio of the wheels of the vehicle upon brake application, and more particularly to such an anti-skid braking system for a four-wheel drive vehicle. The invention is also concerned with a method of controlling such an anti-skid braking system.

2. Discussion of the Prior Art

Skidding of the wheels of an automobile upon brake application will deteriorate the straight-line running stability and the braking effect. To avoid the skidding of the wheels, various approaches have been attempted. One of the approaches has been to incorporate a so-called "anti-skid" device in the braking system of the vehicle. The anti-skid device includes an actuator for increasing or decreasing the hydraulic braking pressures in the brake cylinders to apply brakes to the rotating wheels, and a controller to control the actuator. The controller is adapted to obtain the slip ratios of the wheels based on detected angular speeds or accelerations of the wheels, and commands the actuator so that the slip ratio of each wheel is held within an optimum range. An example of a widely used anti-skid braking system is disclosed in Laid-Open Publication No. 58-26660 of Japanese Patent Application. In the disclosed anti-skid braking system, the actuator has two separate hydraulic circuits for controlling the braking pressures for the left and right front wheels, independently of each other, and a single common hydraulic circuit for the left and right rear wheels. Also known is an anti-skid braking system wherein the actuator has two separate hydraulic circuits for the left and right rear wheels, as well as two separate hydraulic circuits for the front wheels.

PROBLEMS SOLVED BY THE INVENTION

The known anti-skid braking device or system has some inconveniences if used on a four-wheel drive vehicle in which the left and right front wheels, and the left and right rear wheels are driven by a single drive source. That is, the propeller shaft is subject to torsional vibrations, which are transmitted to the body of the vehicle, deteriorating the driving comfort of the vehicle, and making it difficult to design the anti-skid device so as to function in a suitable manner. In the four-wheel drive vehicle wherein the front wheels and the rear wheels are driven by the same drive source, the front axles and the rear axles are usually connected to each other by a propeller shaft. When the braking pressures for the front and/or rear wheels are increased or decreased upon activation of the anti-skid device, a variation in the torsional torque applied to the propeller shaft is increased, causing torsional vibrations of the propeller shaft. These vibrations will cause vibrations of the vehicle body, and periodic changes in the angular speed or acceleration of the front and/or rear wheels. Further, the anti-skid device has operational delays of the controller and actuator, and also an operational delay of the brakes. Usually, there is provided a suitable time between the moment when the controller has confirmed the commencement of an increase or decrease in the slip ratio of the wheels, and the moment when the controller commands the actuator to start decreasing or increasing the braking pressures. Hence, the increase or decrease of the braking pressures is delayed with respect to the periodic variation in the angular speed or acceleration of the wheels due to the torsional vibration of the propeller shaft, by a certain time approximating half of the period of the variation of the angular speed or acceleration. This delay would easily cause a vibrating state of the total system which includes the power transmitting system and the anti-skid braking system. Thus, the anti-skid braking system for a four-wheel drive vehicle is more difficult to design, than that for a two-wheel drive vehicle.

SUMMARY OF THE INVENTION

It is accordingly an object of the present invention to provide an anti-skid braking system for a four-wheel drive vehicle, which is suitable for minimizing the torsional vibration of the propeller shaft, and thereby assuring improved driving comfort of the vehicle.

Another object of the invention is to provide a method suitable for controlling such an anti-skid braking system.

According to the present invention, there is provided an anti-skid braking system for a four-wheel drive vehicle having a left-front and a right-front wheel, and a left-rear and a right-rear wheel, all of which are driven by a common drive source through a pair of front axles respectively connected to the left-front and right-front wheels, a pair of rear axles respectively connected to the left-rear and right-rear wheels, a propeller shaft for connecting the front and rear pairs of axles, a differential disposed on at least one of the front and rear pairs of axles, the anti-skid braking system including an actuator capable of controlling mutually independently the braking pressures of at least one pair of left and right wheels which comprise the wheels connected to the at least one pair of axles on which the differential is disposed, and further including a controller operable to detect slip ratios of the at least one pair of left and right wheels, the controller controlling the actuator so as to maintain the slip ratios of each of the at least one pair of left and right wheels within an optimum range, thereby preventing skidding of each of the left and right wheels on a road surface upon application of brakes to the left and right wheels, the anti-skid braking device being characterized in that the controller is adapted to determine for each of the left and right wheels, based on the detected slip ratios, whether the braking pressure must be increased or decreased, and in that the controller is operable to command the actuator, upon determination of simultaneous increases and/or simultaneous decreases of the braking pressures of both of the left and right wheels, such that the braking pressure of one of the left and right wheels is controlled in a normal manner as determined by the controller, while the braking pressure in the other of the left and right wheels is controlled in an override manner different from the normal manner.

According to one advantageous feature of the invention, the at least one pair of left and right wheels consist of the left-rear and right-rear wheels, and the controller commands the actuator, upon determination of the simultaneous increases of the braking pressures in both of the left-rear and right-rear wheels, such that the braking pressure is one of the left-rear and right-rear wheels is increased, while the braking pressure in the other of the left-rear and right-rear wheels is decreased.

According to another advantageous feature of the invention, the at least one pair of left and right wheels consist of the left-rear and right-rear wheels, and the actuator is operable to maintain the braking pressures of the left-rear and right-rear wheels, at constant levels, the controller commanding the actuator, upon determination of the simultaneous increases of the braking pressures in both of the left-rear and right-rear wheels, such that the braking pressure in one of the left-rear and right-rear wheels is increased, while the braking pressure in the other of the left-rear and right-rear wheels is maintained.

According to a further advantageous feature of the invention, the at least one pair of left and right wheels consist of the left-front and right-front wheels, and the controller commands the actuator, upon determination of the simultaneous decreases of the braking pressures in both of the left-front and right-front wheels, such that the braking pressure in one of the left-front and right-front wheels is decreased, while the braking pressure in the other of the left-front and right-front wheels is increased.

According to a still further advantageous feature of the invention, the at least one pair of left and right wheels consist of the left-front and right-front wheels, and the actuator is operable to maintain the braking pressures of the left-front and right-front wheels, at constant levels, the controller commanding the actuator, upon determination of the simultaneous decreases of the braking pressures in both of the left-front and right-front wheels, such that the braking pressure in one of the left-front and right-front wheels is decreased, while the braking pressure in the other of the left-front and right-front wheels is maintained.

The angular speed of the propeller shaft at its end connected via a differential to the front or rear pair of axles corresponds to an average angular speed of the left and right wheels which are connected to each other by the differential. Therefore, simultaneous increases or decreases of the angular speed of these left and right wheels will cause a relatively large change in the angular speed of the propeller shaft at its end nearer to those wheels. As a result, the torsional vibration of the propeller shaft is increased, and the total system of the vehicle previously indicated is brought into a vibrating state. However, if the braking pressures are changed in the opposite directions for the left and right wheels, for example, if the braking pressure for the right wheel is decreased while that for the left wheel is increased, a change in the average angular speed of the left and right wheels upon anti-skidding operation of the anti-skid braking system is restricted, whereby the torsional vibration of the propeller shaft is minimized.

In the anti-skid braking system according to the present invention as described above, when the controller determines that the braking pressures of both of the left and right wheels connected to each other via a differential must be increased or decreased simultaneously or concurrently, the controller commands the actuator such that the braking pressure in one of the left and right wheels is controlled in the normal manner as determined, while that in the other wheel is controlled in a manner different from that determined by the controller, i.e., in the override manner different from the normal manner. For example, if it becomes necessary to decrease the braking pressure for the right wheel while the braking pressure for the left wheel is in the process of being decreased, the controller commands the actuator to increase or maintain the braking pressure for the left wheel, which pressure was commanded to decrease prior to the generation of the command to decrease the pressure for the right wheel. In the case where the braking pressure for the left wheel is commanded to increase, it is clear that the change or variation of the average angular speed of the left and right wheels is made small enough to effectively reduce the torsional vibration of the propeller shaft. Even in the case where the braking pressure for the left wheel is commanded to be held constant or maintained, the change in the average angular speed of the left and right wheels is reduced, as compared with the case where the pressures for both left and right wheels are commanded to decrease in the normal mode, as initially determined by the controller. In this case, too, some effect of reducing the torsional vibration of the propeller shaft may be obtained.

In the conventional arrangement wherein the braking pressures for both of the left and right wheels are always controlled as determined to hold the detected slip ratios of the wheels within an optimum range, the total system including the power transmitting system and the anti-skid braking system is subject to vibrations. In the instant arrangement of the invention, on the other hand, the braking pressure in one of the left and right wheels is controlled in the override mode, not based on the detected slip ratio, as previously described. This override control of one of the two wheel brake pressures according to the invention will produce disturbances to the vibrating total system, thereby contributing to restraining the vibration of the total system.

From the standpoint of reducing the vibration of the total system, it is desirable to inhibit both of the simultaneous increases and the simultaneous decreases of the braking pressures of the left and right wheels in question. However, the vibration of the total system may be reduced to some extent even if either the simultaneous increases or the simultaneous decreases are inhibited. In the case where the simultaneous increases are inhibited, the braking force for one of the left and right wheels tends to be insufficient, but this tendency is on the side of safety from the standpoint of protecting the wheels from skidding or locking. If the simultaneous decreases are inhibited, on the other hand, the slip ratio of one of the wheels tends to exceed the upper limit, but the insufficiency of the braking force may be overcome. Hence, it is desirable to inhibit the simultaneous decreases of the braking pressures for the front wheels, which have a greater braking effect than the rear wheels, and to inhibit the simultaneous increases of the braking pressures for the rear wheels, the skidding of which has a comparatively adverse effect on the straight-line running stability of the vehicle.

In connection with the insufficiency of braking force or excessive slip ratio of one of the left and right wheels, it is noted that all of the four drive wheels of the four-wheel drive vehicle are connected to each other by means of the power transmitting system, but are not completely operationally independent of each other. Consequently, the braking force applied to one of the four wheels is also imparted to the other wheels, and the slip ratio of only one wheel will not be made remarkably higher than those of the other wheels. The present invention was developed in view of the above tendency inherent in the four-wheel drive vehicle, which may lead to a relatively large variation in the torsional torque applied to the propeller shaft, and consequent vibration of the total system including the power transmitting system and the braking system. To avoid these adverse effects, the controller of a conventional anti-skid braking system is modified according to the principle of the present invention.

As described above, the anti-skid braking system for a four-wheel drive vehicle according to the present invention may be readily obtained by a relatively simple modification to the controller used in a known anti-skid braking system for a normal two-wheel drive vehicle, without considerably changing the other parts of the braking system. The modification of the conventional controller makes it possible to minimize the torsional vibration of the propeller shaft, which deteriorates the driving comfort of the four-wheel drive vehicle.

The controller of the instant braking system may be adapted to command the actuator such that the braking pressure of the previously identified other wheel of the left and right wheels is controlled in the override manner, if the braking pressure of this other wheel is in a process of being changed in the same direction as determined by the controller, at the time of determination of the simultaneous increases and/or simultaneous decreases by the controller.

The controller may also be adapted to command the actuator such that the braking pressure of the previously identified one of the left and right wheels is controlled in the normal manner, if the braking pressure of this one wheel is in a process of being changed in the same direction as determined by the controller, at the time of determination of the simultaneous increases and/or simultaneous decreases by the controller.

The controller may command the actuator to return the control of the braking pressure of the previously identified other wheel from the override manner to the normal manner, if the braking pressure of the other wheel has been deviated from an optimum level by an amount exceeding a predetermined value, as a result of the control of the braking pressure of the other wheel in the override manner.

The controller may comprise a computer for generating control signals for controlling the braking pressures of the at least one pair of left and right wheels in the normal manner, and a modulator connected between the computer and the actuator. The modulator is operable to convert the control signals into override signals to control the braking pressure of the above-indicated other of the left and right wheels in the override manner, the actuator being responsive to the override signals. This arrangement permits the use of a computer which is used for an anti-skid braking system for a common two-wheel drive vehicle. That is, the controller for the instant anti-skid braking system for a four-wheel drive vehicle can be obtained by adding a modulator to the controller of the anti-skid braking system for a two-wheel drive vehicle, rather than using an exclusively designed controller. Thus, the anti-skid braking system according to the present arrangement is economical to manufacture.

The front and rear pairs of axles may be connected to each other through a front differential disposed between the pair of front axles, and a rear differential disposed between the pair of rear axles, such that the front and rear differentials are connected to each other through the propeller shaft and a center differential.

According to the invention, there is also provided a method of controlling an anti-skid braking system for a four-wheel drive vehicle having a left-front and a right-front wheel, and a left-rear and a right-rear wheel, all of which are driven by a common drive source through a pair of front axles respectively connected to the left-front and right-front wheels, a pair of rear axles connected to the left-rear and right-rear wheels, a propeller shaft for connecting the pairs of front and rear axles, and a differential disposed on at least one of the front and rear pairs of axles, the anti-skid braking system including an actuator capable of controlling mutually independently the braking pressures of at least one pair of left and right wheels which comprise the wheels connected to the above-indicated at least one pair of axles on which the differential is disposed, comprising the steps of: (a) detecting slip ratios of the at least one pair of left and right wheels; (b) determining for each of the left and right wheels, based on the detected slip ratios, whether the braking pressures must be increased or decreased, so as to maintain the slip ratios of the left and right wheels within an optimum range, to prevent skidding of the left and right wheels on a road surface upon application of brakes to the left and right wheels; and (c) commanding the actuator, upon determination of simultaneous increases and/or simulaneous decreases of the braking pressures of both of the left and right wheels, such that the braking pressure of one of the left and right wheels is controlled in a normal manner as determined by the controller, while the braking pressure in the other of the left and right wheels is controlled in an override manner different from the normal manner.

The instant method of controlling an anti-skid braking system has the same advantages as previously discussed in connection with the anti-skid braking system of the invention.

BRIEF DESCRIPTION OF THE DRAWINGS

The above and other objects, features and advantages of the present invention will become more apparent by reading the following description of preferred embodiments of the invention, when considered in connection with the accompanying drawings, in which.

DETAILED DESCRIPTION OF THE PREFERRED EMBODIMENTS

Figure 1:
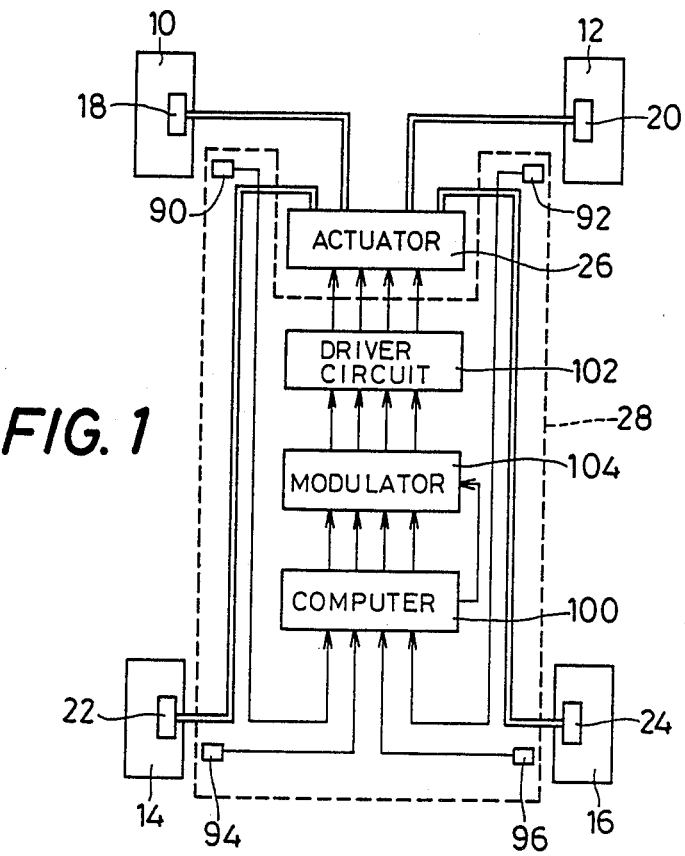
FIG. 1 is a diagrammatic view schematically showing one embodiment of an anti-skid braking system of the present invention for a four-wheel drive vehicle.

Referring to the drawings, a few preferred embodiments of the present invention will be described.

FIG. 1 is a diagrammatic view showing an anti-skid braking system according to one embodiment of the invention, wherein a left-front wheel 10, a right-front wheel 12, a left-rear wheel 14 and a right-rear wheel 16 are provided with respective brakes 18, 20, 22 and 24, which are hydraulically operated for applying brake to the wheels during rotation thereof. The pressures of a brake fluid in these brakes are regulated, or increased or decreased by actuator 26, independently of each other. The actuator 26 is controlled by a controller 28.

Figure 2:
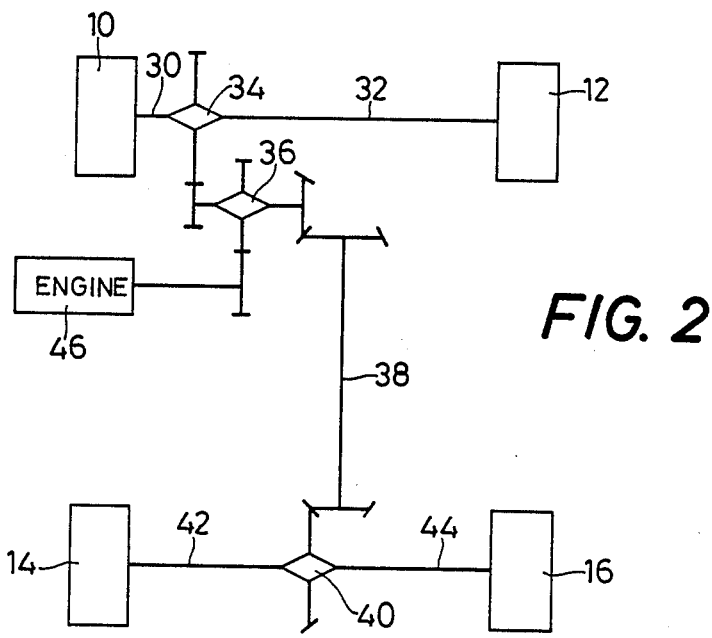
FIG. 2 is a schematic view of a power transmitting system of the vehicle for transmitting an output of an engine of the vehicle to each of the drive wheels shown in FIG. 2.

As shown in FIG. 2, the above-indicated wheels 10, 12, 14 and 16 are connected to each other by means of a power transmitting system which includes a pair of front axles 30, 32, a front differential 34, a center differential 36, a propeller shaft 38, a rear differential 40 and a pair of rear axles 42, 44. At the same time, the wheels 10, 12, 14 and 16 are connected through the power transmitting system to an engine 46 of the vehicle, which is a common drive source for the four drive wheels. The drive force of the engine 46 is distributed by the center differential 36, to the front and rear differentials 34, 40. The front differential 34 delivers the received drive force to the left-front and right-front wheels 10, 12, while the rear differential 40 delivers the received drive force to the left-rear and right-rear wheels 14, 16. The front differential 34, the center differential 36 and the engine 46 are disposed in the front part of the vehicle, and the propeller shaft 38 is disposed so as to extend in the longitudinal direction of the vehicle.

Figure 3:
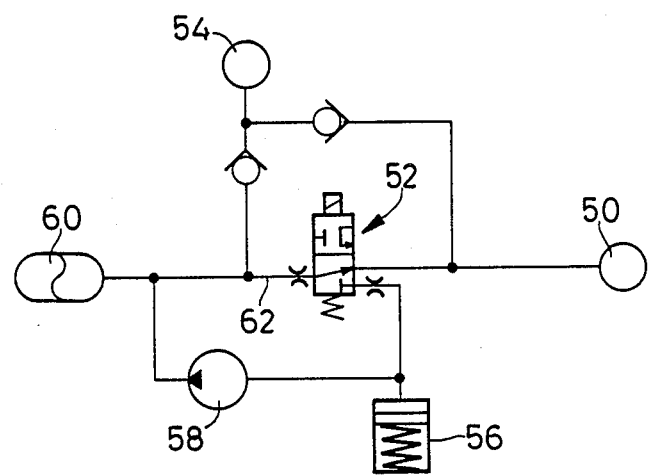
FIGS. 3 and 4 are diagrammatic views illustrating in detail hydraulic circuits of the actuator shown in FIG. 1.
Figure 4:
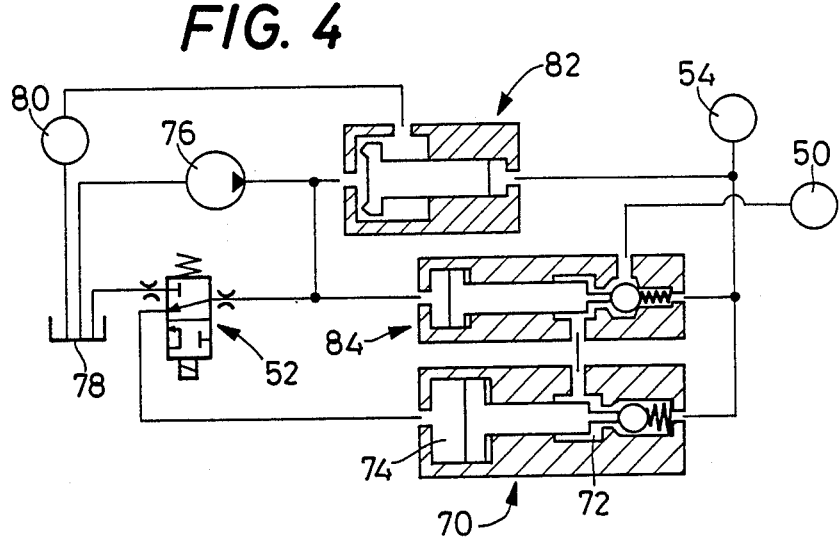

The actuator 26 may be of either a "closed-circuit" type as shown in FIG. 3, or a "variable-volume" type as shown in FIG. 4. It is noted that FIG. 3 and FIG. 4 show one of four identical circuits for the four brakes 18, 20, 22 and 24, and that the actuator 26 incorporates the four circuits each of which is constructed as shown in the figures.

The actuator of the "closed-circuit" type of FIG. 3 is adapted such that the brakes 18, 20, 22 and 24 are brought into communication with a master cylinder 54 or a reservoir 56, selectively, by a solenoid-operated directional control valve 52. The pressure in a wheel brake cylinder 50 is increased as the pressurized brake fluid is fed from the master cylinder 54 into the wheel brake cylinder 50, and decreased as the brake fluid is discharged from the brake cylinder 50 into the reservoir 56. The brake fluid in the reservoir 56 is pumped by a pump 58, and stored in an accumulator 60. The fluid in the accumulator 60 is returned as needed, to a main fluid passage 62 which connects the master cylinder 54 and the brake cylinder 50. This is the reason why the actuator of FIG. 3 is referred to as "closed-circuit" type.

On the other hand, the actuator of the "variable-volume" type of FIG. 4 is adapted such that the pressure of the brake fluid in the wheel brake cylinder 50 is controlled by changing the volume of a brake-pressure chamber 72 in a regulator 70. The regulator 70 has a pressure chamber 74 which is brought into communication with a pump 76 or a reservoir 78, selectively, by the solenoid-operated directional control valve 52. The pressure in the brake-pressure chamber 72, that is, the pressure in the brake cylinder 50 is increased or decreased by controlling the pressure in the pressure chamber 74. In this type of actuator, the pump 76 is used primarily for operating a power steering device 80 of the vehicle. The actuator has a regulator 82 which is normally placed in a position in which the pressurized fluid generated by the pump 76 is allowed to freely flow through the regulator 82 to the power steering device 80. Only when a pressure is built up in the master cylinder 54 upon depression of a brake pedal on the vehicle, the fluid of the pressure proportional to the pressure in the master cylinder 54 is delivered from the pump 76 to the pressure chamber 74, through the solenoid-operated directional control valve 52. Reference numeral 84 designates a by-pass valve which permits the fluid pressure in the master cylinder 54 to be applied to the brake cylinder 50 without passing through the regulator 70, in the event of a failure of the pump 76 or any other trouble in the actuator.

As described above, both of the actuators of the "closed-circuit" and "variable-volume" types use the solenoid-operated directional control valve 52 which is operated to control the fluid pressure in the brake cylinder 50 provided for each of the wheel brakes 18, 20, 22, 24. The control valve 52 is controlled by the controller 28 indicated above.

The controller 28 includes speed sensors 90, 92, 94 and 96 for detecting angular speeds of the respective drive wheels 10, 12, 14 and 16. These speed sensors generate speed signals which are applied to the computer 100 for calculating the slip ratio of each wheel. Based on the calculated slip ratio, a driver circuit 102 of the controller 28 is operated to control the solenoid-operated directional control valve 52 of the actuator 26. Since the basic control of the actuator 26 by the computer 100 is similar to that in a conventional anti-skid braking system, and is well known in the art, no detailed description thereof will be provided herein. However, it is noted that the controller 28 employed in the present embodiment incorporates a modulator 104 connected between the computer 100 and the driver circuit 102.

Figure 5:
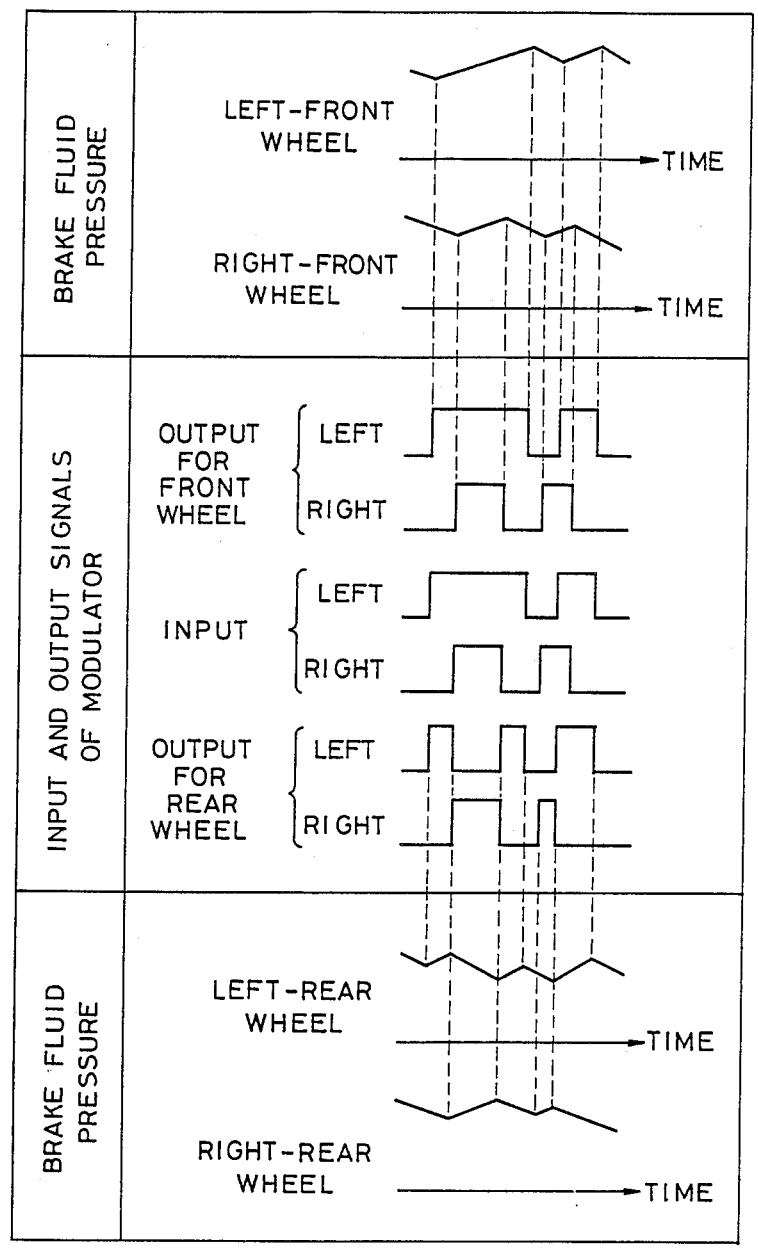
FIG. 5 is an explanatory view indicating the function of one form of the modulator shown in FIG. 1.

For the front brakes 18 and 20, the modulator 104 is adapted to apply its output signals (solenoid-control signals) to the driver circuit 102, without changing or modifying the input control signals received from the computer 100, as indicated in FIG. 5. For the rear brakes 22, 24, however, the input control signals received by the modulator 104 are converted by the modulator 104 into override signals to be applied to the driver circuit 102, as also indicated in FIG. 5. Described more specifically, if the computer 100 determines, based on the speed signals from the speed sensors 94, 96, that the fluid pressures in the brakes 22 and 24 for the left and right rear wheels 14, 16 must be both increased simultaneously, the computer 100 applies to the modulator 104 the low-level control signals to command simultaneous increases of the pressures in both of the rear brakes 22, 24. In this case, the modulator 104 applies the override signal to the driver circuit 102, so that the pressure in one of the rear brakes 22, 24 which was commanded to increase prior to the pressure in the other rear brake is unconditionally or automatically decreased, as soon as the increase of the pressure in the above-indicated other rear brake has been commanded. The graphs of FIG. 5 show the changes in the fluid pressures in the brakes, without a delay with respect to the changes in the level of the input and output command signals of the modulator 104, for easier understanding of the principle of the invention. Actually, however, the fluid pressure changes have a certain length of delay with respect to the changes in the level of the command signals. This delay is the very primary cause for vibrations of the total system which includes the power transmitting system and the braking system.

As described above, the pressures in the front brakes 18, 20 are controlled in the normal manner, i.e., increased or decreased as determined by the computer 100 based on the speed signals from the sensors 90, 92.

In other words, the braking pressures for the front wheels 10, 12 are controlled for the sole purpose of maintaining the slip ratios of the wheels within the optimum range. For rear brakes 22, 24, however, simultaneous or concurrent increases in the fluid pressures in the brakes 22, 24 are inhibited by the modulator 104. That is, the pressure in one of the rear brakes 22, 24 is commanded to decrease even if the computer 100 has determined that the pressure in that one of the rear brakes must be increased. Accordingly, the braking force of one of the rear brakes which is commanded to decrease tends to be insufficient. However, this decrease in the braking pressure in one of the two rear brakes will not cause a significant reduction in the overall braking effect on the vehicle, since the braking effect produced by the rear wheels is smaller than that by the front wheels. Further, if the system including the power transmitting system and the braking system is in a vibrating condition, the control signal from the computer 100 commanding an increase of the braking pressure is not necessarily based on the actual slip ratio of the corresponding rear wheel. Therefore, an increase in the braking pressure in the presence of the solenoid-signal commanding an increase does not necessarily mean an insufficient braking force for that rear wheel.

As a result of inhibition of simultaneous increases of the fluid pressures in the rear brakes 22, 24 as described above, a variation in the average angular speed of the left and right rear wheels 14, 16 is made smaller than that when the modulator 104 is not provided. Accordingly, the variation in the angular speed of the propeller shaft 38 at its end on the side of the rear differential 40 is reduced, leading to a decrease in the magnitude of torsional vibration of the propeller shaft 38. Thus, the vibration of the total system including the power transmitting system and the braking system is reduced. Further, the above-indicated operation of the modulator 104 to override the control signal from the computer 100 for controlling the fluid pressure in one of the rear wheels 22, 24 will disturb the vibrating total system, thereby restraining the vibration of the total system.

Normally, the modulator 104 is operated to override the controls from the computer 100 to control the pressures in the rear brakes 2, 24 as indicated above. However, if the override by the modulator 104 results in the slip ratio of the left-rear or right-rear wheel 14, 16 being deviated from the limits of the optimum range, by an amount exceeding the predetermined value, the computer 100 detects this fact based on the speed signals from the speed sensors 94, 96, and places the modulator 104 in its disabled state, inhibiting its override function as described above. After the slip ratio of the rear wheel 14, 16 returns to a value within the optimum range, the modulator 104 is restored to its operative state to attain its override function for one of the rear brakes 22, 24.

Figure 6:
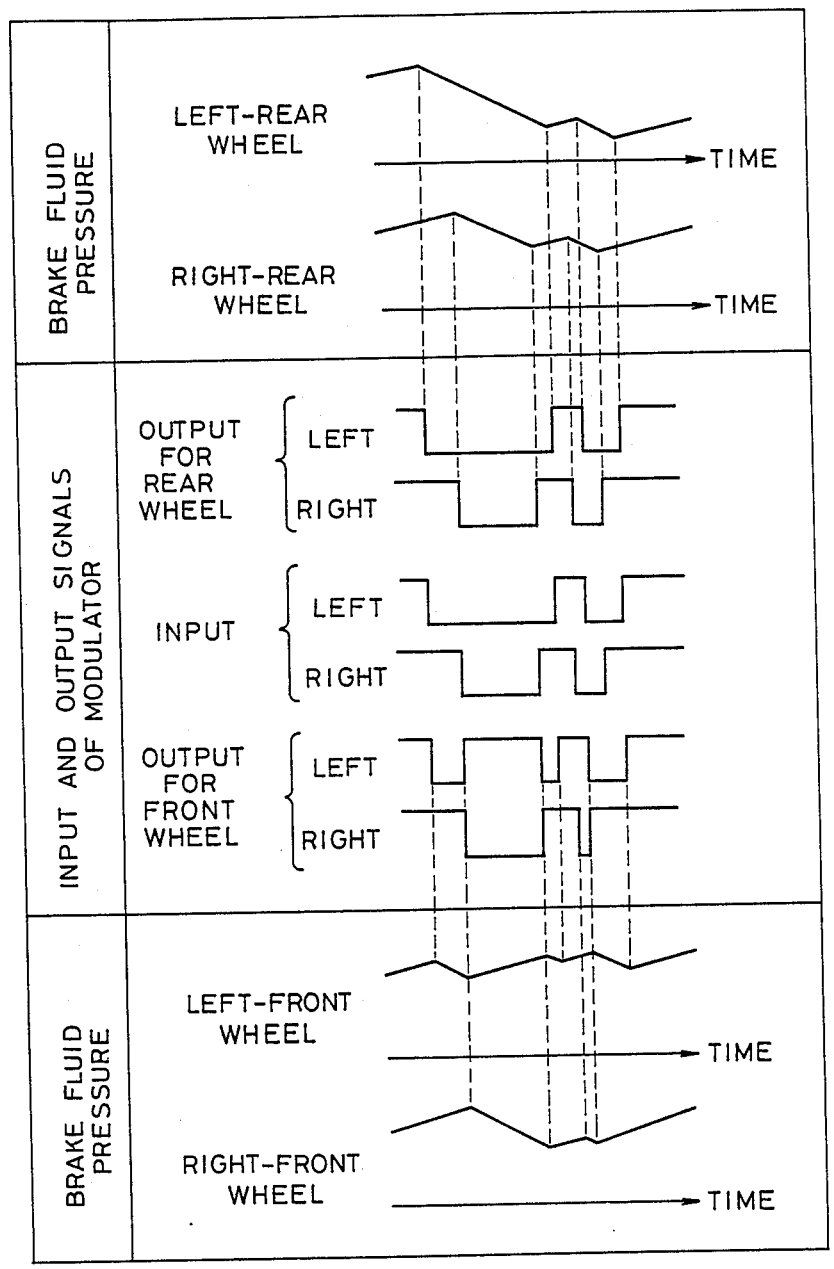
FIG. 6 is an explanatory view indicating the function of another form of the modulator 1.

While the simultaneous increases in the fluid pressures in both of the rear brakes 22, 24 are inhibited in the instant embodiment described above, the principle of the present invention may be practiced to inhibit simultaneous decreases of the pressures in both of the front brakes 18, 20, as illustrated in FIG. 6. Described in detail, if a command is generated to decrease the pressure in one of the front brakes 18, 20 while the pressure in the other front brake is being decreased, the control signal to command the decrease in the pressure of the above other front brake is converted by the modulator 104 into the override signal to command an increase in the above other front brake. Accordingly, a variation in the average angular speed of the left and right front wheels 10, 12 is reduced, and the torsional vibration of the propeller shaft 38 is decreased. Thus, the modulator 104 is operated to effectively prevent the vibrating condition of the total system including the power transmitting system and the braking system.

If the slip ratio of one of the two front wheels is excessively deviated from the limits of the optimum range as a result of inhibition of the simultaneous decreases in both of the front brakes 18, 20, the computer 100 disables the modulator 104, prohibiting the override function of inhibiting the simultaneous decreases, as in the preceding embodiment.

In the illustrated two embodiments, the actuator 26 has four separate circuits for controlling the pressures in the brakes for the respective four drive wheels, independently of each other. It is possible that the actuator has a single circuit for both left and right brakes of either the front wheels or the rear wheels. In this case, the principle of the invention is applied to the left and right brakes of the front or rear wheels whose pressures are controlled independently of each other.

The two different types of override functions of the modulator 104 shown in FIGS. 5 and 6 may be attained in the braking system of the same vehicle. Further, it is possible to inhibit simultaneous increases of the pressure in the front brakes, and simultaneous decreases of the pressure in the rear brakes.

In the illustrated embodiments, the prior control signal to increase or decrease the pressure in one of the front or rear brakes is replaced by an override or reverse signal to decrease or increase the pressure in the same brake, when the subsequent signal to increase or decrease the pressure in the other of the front or rear brakes is generated. However, the above-indicated subsequent signal to increase or decrease the pressure in said other brake may be replaced by or changed to an override or reverse signal to decrease or increase the pressure in that other brake, respectively.

The illustrated embodiments use the modulator 104 separate from the computer 100, in order to override or reverse the increase and decrease control signals from the computer 100. However, the computer 100 may be modified so as to also function as the modulator 104.

Figure 7:
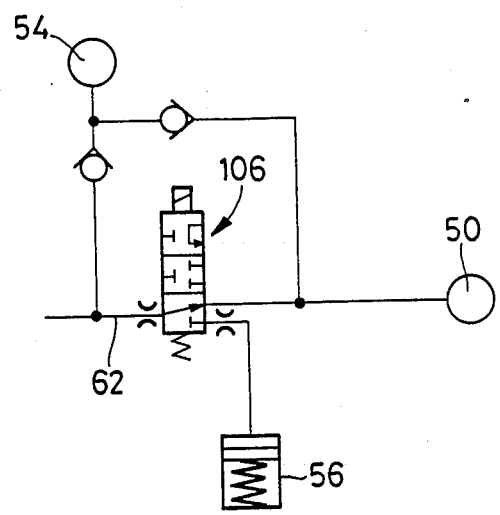
FIG. 7 is a view showing an actuator used in a modified embodiment of the invention.

Although the actuator 26 of the illustrated embodiment is capable of only increasing and decreasing the pressures in the wheel brakes, the present invention is applicable to an anti-skid braking system of a type wherein the actuator is capable of holding or maintaining the brake pressures, as well as increasing and decreasing the brake pressures. Described more specifically, the actuator has a solenoid-operated three-position directional control valve 106 as shown in FIG. 7, in place of the two-position control valve 52 shown in FIGS. 3 and 4. This control valve 106 has a pressure-hold position (intermediate position in FIG. 7) for maintaining the pressure in the wheel brake cylinder 50 for each brake 18, 20, 22, 24, in addition to the pressure-increase and pressure-decrease positions as provided in the two-position control valve 52 of FIGS. 3 and 4. In this case, too, it is possible that one of the concurrent decrease commands for the left and right brakes is changed to an increase command, while one of the concurrent increase commands for the two brakes is changed to a decrease command. However, one of the two concurrent decrease or increase commands may be changed to a hold command to maintain the currently established pressure. Further, the present invention is applicable to an anti-skid braking system wherein the actuator is capable of effecting fast increase, slow increase, fast decrease and slow decrease of the braking pressures.

While the illustrated embodiments are adapted to the four-wheel drive vehicle wherein all of the four wheels are always driven by the engine, the present invention may be applied to an anti-skid braking system in a vehicle which is driven selectively in either the two-wheel drive mode, or the four-wheel drive mode, as needed. In this instance, the override function of the modulator is cancelled while the vehicle is placed in the two-wheel drive motor.

It will be understood that the present invention may be embodied with various other changes and improvements, which may occur to those skilled in the art.

What is claimed is:

1. An anti-skid braking system for a four-wheel drive vehicle having a left-front and a right-front wheel, and a left-rear and a right-rear wheel, all of which are driven by a common drive source through a pair of front axles respectively connected to said left-front and right-front wheels, a pair of rear axles respectively connected to said left-rear and right-rear wheels, a propeller shaft for connecting said pairs of front and rear axles, and a differential disposed on at least one of said front and rear pairs of axles, said anti-skid braking system including an actuator capable of controlling mutually independently the braking pressures of at least one pair of left and right wheels which comprise the wheels connected to said at least one pair of axles on which said differential is disposed, and further including a controller means operable to detect slip ratios of said at least one pair of left and right wheels, and to control said actuator to maintain said slip ratios of each of said at least one pair of left and right wheels within an optimum range, thereby preventing skidding of said each pair of left and right wheels on a road surface upon application of brakes to said left and right wheels, wherein the improvement comprises:

said controller means being operable during braking to make an initial determination for each of said left and right wheels, based on the detected slip ratios, whether the braking pressure should be increased or decreased; and to command said actuator, upon an initial determination that simultaneous increases and/or simultaneous decreases of the braking pressures of both of said left and right wheels should occur, in a manner that the braking pressure of one of said left and right wheels is controlled in a normal manner, in accordance with said initial determination, while the braking pressure in the other of said left and right wheels is controlled in an override manner different from said normal manner, whereby torsional vibration of said propeller shaft during braking is reduced.

2. An anti-skid braking system according to claim 1, wherein said at least one pair of left and right wheels consist of said left-rear and right-rear wheels, and said controller means is operable to command said actuator, upon said initial determination that simultaneous increases of the braking pressures in both of said left-rear and right-rear wheels should occur, in a manner that the braking pressure in one of said left-rear and right-rear wheels is increased, while the braking pressure in the other of said left-rear and right-rear wheels is decreased.

3. An anti-skid braking system according to claim 1, wherein said at least one pair of left and right wheels consist of said left-rear and right-rear wheels, and said actuator is operable to maintain the braking pressures of said left-rear and right-rear wheels, at constant levels, said controller means being operable to command said actuator, upon said initial determination that simultaneous increases of the braking pressures in both of said left-rear and right-rear wheels should occur, in a manner that the braking pressure in one of said left-rear and right-rear wheels is increased, while the braking pressure in the other of said left-rear and right-rear wheels is maintained.

4. An anti-skid braking system according to claim 1, wherein said at least one pair of left and right wheels consist of said left-front and right-front wheels, and said controller means is operable to command said actuator, upon said initial determination that simultaneous decreases of the braking pressures in both of said left-front and right-front wheels should occur, in a manner that the braking pressure in one of said left-front and right-front wheels is decreased, while the braking pressure in the other of said left-front and right-front wheels is increased.

5. An anti-skid braking system according to claim 1, wherein said at least one pair of left and right wheels consist of said left-front and right-front wheels, and said actuator is operable to maintain the braking pressures of said left-front and right-front wheels, at constant levels, said controller means being operable to command said actuator, upon said initial determination that simultaneous decreases of the braking pressures in both of said left-front and right-front wheels should occur, in a manner that the braking pressure in one of said left-front and right-front wheels is decreased, while the braking pressure in the other of said left-front and right-front wheels is maintained.

6. An anti-skid braking system according to claim 1, wherein said controller means is operable to command said actuator in a manner that the braking pressure of said other of the left and right wheels is controlled in said override manner, if the braking pressure of said other wheel is being changed in the same direction as it is determined by said controller means, in said initial determination, that the braking pressure of said one of the left and right wheels should be changed, at the time of said initial determination.

7. An anti-skid braking system according to claim 1, wherein said controller means is operable to command said actuator in a manner that the braking pressure of said one of the left and right wheels is controlled in said normal manner, if the braking pressure of said one wheel is being changed in the same direction as it is determined by said controller means, in said initial determination, that the braking pressure of said other of the left and right wheels should be changed, at the time of said initial determination.

8. An anti-skid braking system according to claim 1, wherein said controller means is operable to command said actuator to return the control of the braking pressure of said other wheel from said override manner to said normal manner, if the braking pressure of the said other wheel deviates from an optimum level by an amount exceeding a predetermined value as a result of the control of the braking pressure of said other wheel in said override manner.

9. An anti-skid braking system according to claim 1, wherein said controller means comprises a computer for generating control signals for controlling the braking pressures of said at least one pair of left and right wheels in said normal manner, and a modulator connected between said computer and said actuator, said modulator converting said control signals into override signals to control the braking pressure of said other of the left and right wheels in said override manner, said actuator being responsive to said override signals.

10. An anti-skid braking system according to claim 1, wherein said front and rear axles are connected to each other through a front differential between said pair of front axles, and a rear differential disposed between said pair of rear axles, said front and rear differentials being connected to each other through said propeller shaft and a center differential.

11. A method of controlling an anti-skid braking system for a four-wheel drive vehicle having a left-front and a right-front wheel, and a left-rear and a right-rear wheel, all of which are driven by a common drive source through a pair of front axles respectively connected to said left-front and right-front wheels, a pair of rear axles connected to said left-rear and right-rear wheels, a propeller shaft for connecting said pairs of front and rear axles, and a differential disposed on at least one of said front and rear pairs of axles, said anti-skid braking system including an actuator capable of controlling mutually independently the braking pressures of at least one pair of left and right wheels which comprise the wheels connected to said at least one pair of axles on which said differential is disposed, said method comprising the steps of:

detecting slip ratios of said at least one pair of left and right wheels;

making an initial determination for each of said left and right wheels, based on the detected slip ratios, of whether the braking pressures must be increased or decreased, so as to maintain said slip ratios of said left and right wheels within an optimum range, to prevent skidding of said left and right wheels on a road surface upon application of brakes to said left and right wheels; and commanding said actuator, upon an initial determination that simultaneous increases and/or simultaneous decreases of the braking pressures of both of said left and right wheels should occur, in a manner that the braking pressure of one of said left and right wheels is controlled in a normal manner, in accordance with said initial determination, while the braking pressure in the other of said left and right wheels is controlled in an override manner different from said normal manner, whereby torsional vibration of said propeller shaft during braking is reduced.

* * * * *